(12) United States Patent
Allen et al.

(10) Patent No.: US 6,696,176 B2
(45) Date of Patent: Feb. 24, 2004

(54) SUPERALLOY MATERIAL WITH IMPROVED WELDABILITY

(75) Inventors: David B. Allen, Oviedo, FL (US); Gregg P. Wagner, Apopka, FL (US); Brij B. Seth, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/092,326

(22) Filed: Mar. 6, 2002

(65) Prior Publication Data
US 2003/0170489 A1 Sep. 11, 2003

(51) Int. Cl.[7] .................. B32B 15/01; C22C 19/00; C22C 19/05; C22C 19/07
(52) U.S. Cl. .............. 428/678; 148/408; 148/410; 148/419; 148/425; 148/427; 148/428; 148/442; 416/241 R; 420/436; 420/442; 420/443; 420/445; 420/446; 420/447; 420/448; 420/449; 420/450; 420/451; 420/454; 420/580; 420/588; 428/679
(58) Field of Search ............... 428/678, 679; 148/408, 410, 419, 425, 427, 428, 442; 420/436, 442, 443, 445, 446, 447, 448, 449, 450, 451, 454, 580, 588; 416/241 R

(56) References Cited

U.S. PATENT DOCUMENTS

| | | |
|---|---|---|
| 3,754,903 A | 8/1973 | Goward et al. |
| 3,898,109 A | 8/1975 | Shaw |
| 4,034,142 A | 7/1977 | Hecht |
| 4,108,647 A | 8/1978 | Shaw ............... 420/448 |
| 4,213,026 A | 7/1980 | Duvall et al. |
| 4,231,795 A | 11/1980 | Gibson et al. |
| 4,261,742 A | 4/1981 | Coupland et al. |
| 4,437,913 A | 3/1984 | Fukui et al. |
| 4,494,987 A | 1/1985 | Korenko |
| 4,662,920 A | 5/1987 | Coupland et al. |
| 4,719,080 A | 1/1988 | Duhl et al. |
| 4,938,805 A | 7/1990 | Haydon et al. |
| 4,973,366 A | 11/1990 | Yasuda et al. |
| 5,370,497 A | 12/1994 | Doi et al. |
| 5,554,837 A | 9/1996 | Goodwater et al. |
| 6,007,645 A | 12/1999 | Cetel et al. |
| 6,054,672 A | 4/2000 | Foster et al. |
| 6,084,196 A | 7/2000 | Flowers et al. |
| 6,177,046 B1 * | 1/2001 | Simkovich et al. ......... 148/427 |
| 6,248,453 B1 | 6/2001 | Watson |
| 6,284,392 B1 | 9/2001 | Seth et al. |
| 6,302,649 B1 | 10/2001 | Mukira et al. |
| 6,333,484 B1 | 12/2001 | Foster et al. |

FOREIGN PATENT DOCUMENTS

| | | |
|---|---|---|
| EP | 0 709 477 A1 | 5/1996 |
| EP | 0 969 114 A2 | 1/2000 |
| JP | 2000-210789 | 8/2000 |

* cited by examiner

Primary Examiner—Robert R. Koehler

(57) ABSTRACT

A fusion weldable superalloy containing 0.005–0.5 wt. % scandium. In one embodiment, the superalloy may have a composition similar to IN-939 alloy, but having added scandium and having only 0.005–0.040 wt. % zirconium. A gas turbine component may be formed by an investment casting of such a scandium-containing superalloy, and may include a fusion weld repaired area. A scandium-containing nickel-based superalloy coated with an MCrAlY bond coat will have improved cyclic oxidation resistance due to the sulfur-gettering effect of the scandium.

20 Claims, 1 Drawing Sheet

SUPERALLOY MATERIAL WITH IMPROVED WELDABILITY

STATEMENT OF GOVERNMENT INTEREST

The government of the United States of America has certain rights in this invention pursuant to Contract Number DE-FC21-95MC32267 awarded by the United States Department of Energy.

FIELD OF THE INVENTION

This invention relates generally to the field of materials, and more particularly to superalloy materials for use in high temperature applications, and specifically to superalloy materials exhibiting improved weldability.

BACKGROUND OF THE INVENTION

Nickel and cobalt-based alloys containing chrome, aluminum, titanium and other constituents are well known for use in high temperature applications. Such alloys are commonly referred to as superalloys. The base material of cobalt or nickel is typically present in a concentration of at least 45 wt. % in such materials. Superalloys are commonly used to fabricate gas turbine components that are exposed to very high temperature combustion gases, for example rotating blades and stationary vanes. Superalloys exhibit high strength and corrosion and oxidation resistance at very high temperatures, but they are also known to be susceptible to cracking during fusion welding.

Weldability is an essential material requirement affecting the overall cost of a superalloy component. The initial component fabrication cost is affected by the ease of repairing casting defects and the ability to fabricate multi-piece component assemblies requiring welding. Long term operating cost is affected by the ability to repair a damaged component rather than replacing it. The term weldability is commonly used to describe the ease with which a material may be fusion welded without the formation of cracking. One measure of weldability is the Sigmajig test, which measures the threshold stress for hot cracking. This test was developed at Oak Ridge National Laboratory to quantitatively rank the relative weldability of alloys that are prone to hot cracking. The test involves the application of a transverse stress to a rectangular specimen sheet as an autogenous gas tungsten arc weld is applied across the sheet. Cracking of the specimen will occur when the pre-applied stress exceeds a threshold value. The higher the value of this threshold stress, the more weldable is the material.

Special processes have been developed for improving the weldability of superalloy materials. Such processes generally involve costly pre-heat and/or post weld heat treatments. Many compositions of superalloy materials have been developed in an attempt to achieve good weldability without sacrificing the other beneficial properties of a superalloy material. One such composition is described in U.S. Pat. No. 6,284,392 as a nickel-based alloy containing a specific combination of small amounts of both boron and zirconium.

Scandium has been used in prior art superalloy compositions. U.S. Pat. No. 4,662,920 mentions scandium as one of several elements that may be added to a nickel-based alloy used for handling molten glass in order to provide dispersion strengthening and further corrosion resistance. None of the comparative examples described in that patent actually contain scandium. U.S. Pat. No. 4,261,742 describes a high-chrome, nickel-based, platinum group-containing superalloy including scandium for oxidation/corrosion resistance. Such platinum-containing alloys are generally costly. U.S. Pat. No. 6,007,645 describes a single crystal alloy which may include scandium or other elements for increasing the creep-rupture strength and oxidation and corrosion resistance of the material. Single crystal alloys are known to be difficult to weld, and particularly difficult to weld while retaining a single crystal structure. Nothing in the prior art describes any relationship between scandium and the weldability of a superalloy, nor is there any teaching in the prior art regarding the relationship of scandium and other elements with regard to weldability.

SUMMARY OF THE INVENTION

Further improvement in the weldability of superalloy materials is desired. Improved materials should exhibit an increased resistance to hot cracking while maintaining the high temperature strength of known superalloys. Improved materials should avoid the use of the expensive platinum group of elements.

Accordingly, a fusion weldable alloy is described herein as consisting essentially of the composition by weight percent of: chromium 22.0–22.8%; cobalt 18.5–19.5%; titanium 3.6–3.8%; aluminum 1.8–2.0%; tungsten 1.8–2.2%; niobium 0.9–1.1%; tantalum 1.3–1.5%; carbon 0.13–0.17%; zirconium 0.005–0.040%; boron 0.004–0.014%; iron 0.5% maximum; sulfur 0.005% maximum; silver 0.0005% maximum; bismuth 0.00005% maximum; silicon 0.2% maximum; manganese 0.2% maximum; lead 0.005% maximum; nitrogen 0.005% maximum; scandium 0.005–1.0%; and the balance nickel. The nickel-based superalloy may have greater than 0.100% scandium, or greater than 0.300% scandium, or it may have 0.005–0.5% scandium.

Another fusion weldable alloy is described herein as including: at least 45% by weight of at least one of the group of nickel and cobalt; 18–37% by weight chromium; at least 0.005% by weight scandium; and less than 0.04% by weight zirconium. The fusion weldable alloy may further include 0.005–0.040% by weight zirconium. The fusion weldable alloy may include least 0.100% by weight scandium, or at least 0.300% by weight scandium, or it may include 0.005–0.5% by weight scandium, or 0.005–1.0% by weight scandium. The fusion weldable alloy may include less than 3% by weight of the platinum group metals platinum, palladium, rhodium, iridium, osmium and ruthenium. It may further include between 0.001–0.005% by weight boron, and the combination of zirconium, boron and scandium may be in the range of 0.005–0.06%. The fusion weldable alloy may have an MCrAlY bond coat disposed over at least a portion of its surface.

A turbine component is described herein as being made from one of the alloys described above. The turbine component may include an MCrAlY bond coat disposed over a surface of the alloy. The turbine component may further include a fusion weld repaired area formed in the alloy.

BRIEF DESCRIPTION OF THE DRAWINGS

These and other advantages of the invention will be more apparent from the following description in view of the drawings which include.

DETAILED DESCRIPTION OF THE INVENTION

Figure 1:
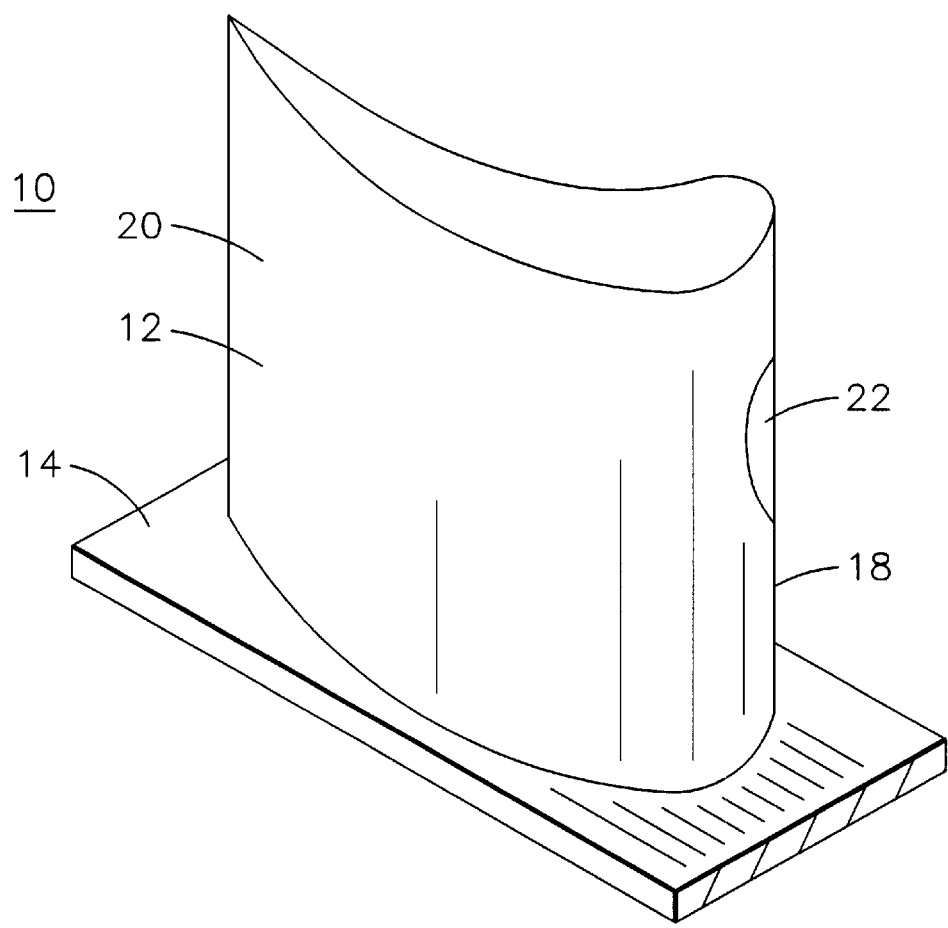
FIG. 1 illustrates a gas turbine vane formed of a scandium-containing superalloy.

It is known to utilize zirconium in a conventional superalloy to getter tramp sulfur in the melt via formation of a sulfide phase, thereby reducing sulfur segregation to the grain boundaries in the solid alloy. This is desirable because sulfur is known to be deleterious to the creep properties of a superalloy. Zirconium may also have a beneficial effect of reducing grain boundary diffusion in the alloy.

The present inventors have found that small amounts of scandium may be used to improve the weldability of a superalloy while preserving the strength of the alloy, particularly when the scandium is used with a reduced or limited amount of zirconium. Scandium may be added to a superalloy melt either in the form of elemental scandium or as an aluminum-scandium master alloy. It should also be possible to add the scandium by pre-alloying with other base metal elements, such as nickel or chromium. The addition of scandium will cause a scandium sulfide phase to form in the high temperature melt. The scandium sulfide phase will precipitate out of the melt during solidification, thus reducing the remaining sulfur content of the melt and de-sulfurizing the alloy. The reduction in sulfur content prevents the occurrence of the very low temperature nickel-nickel sulfide eutectic reaction, thus decreasing the freezing range of the alloy and improving weldability.

Scandium and zirconium are quite similar in their physical characteristics. Both elements possess a hexagonal close-packed crystal structure. The atomic radii of scandium and zirconium are also quite close, at 2.09 and 2.16 Angstroms, respectively. However, the present inventors have noted one important difference between these elements. Scandium has a maximum solubility in nickel of approximately 0.5 atomic weight percent (0.4 weight percent), whereas zirconium is virtually insoluble in nickel. Because of this characteristic, zirconium will be rejected from the alloy matrix and enriched at the grain boundaries as the material solidifies. This has been found to have a marked effect on the weldability of the alloy, which is postulated to be caused by hot cracking due to the presence of several low temperature nickel-zirconium eutectics at 808–1,470° C. Scandium, with its greater solubility in nickel, will be incorporated into the nickel matrix during solidification, and therefore will not be enriched at the grain boundaries. Zirconium additions are made to most common superalloys as well as to some nickel-iron alloys for the purpose of improving elevated temperature mechanical properties and for hot workability. Scandium should be suitable as a substitute for at least a portion of the zirconium in these alloys, or as an addition to the zirconium in these alloys, in order to improve the weldability of the alloy.

Additions of scandium should also prove beneficial in strengthening the superalloy, particularly at elevated temperatures, both via solid solution strengthening and by the formation of carbides, similar to the effect of zirconium in such alloys. Zirconium has been described in U.S. Pat. No. 6,284,392 as having a synergistic behavior with boron, and scandium may share this effect as well.

Scandium should prove effective in increasing the cyclic oxidation resistance of nickel superalloys. In most modern gas turbine applications, a nickel-based superalloy is covered with an MCrAlY bond coat. The aluminum in the MCrAlY forms a protective alumina layer that improves the oxidation/corrosion resistance of the component. Sulfur has been found to degrade the protective alumina scale. By reacting with and thus removing free sulfur in the alloy, scandium should afford improved alumina scale adhesion and thus increased cyclic oxidation resistance.

In one embodiment, a commonly used nickel-based superalloy, sold under the name IN-939, is improved by the substitution of a portion of its zirconium with scandium. The specification for IN-939 has the following range of constituents on a weight percentage basis: chromium 22.0–22.8%; cobalt 18.5–19.5%; titanium 3.6–3.8%; aluminum 1.8–2.0%; tungsten 1.8–2.2%; niobium 0.9–1.1%; tantalum 1.3–1.5%; carbon 0.13–0.17%; zirconium 0.14% maximum; boron 0.004–0.014%; iron 0.5% maximum; sulfur 0.005% maximum; silver 0.0005% maximum; bismuth 0.00005% maximum; silicon 0.2% maximum; manganese 0.2% maximum; lead 0.005% maximum; nitrogen 0.005% maximum; and the balance nickel. A new superalloy composition may be made by adding at least 0.005 wt. % scandium, or at least 0.100 wt. % scandium, or at least 0.300 wt. % scandium, or between 0.005–0.5 wt. % scandium, or between 0.005–0.1 wt. % scandium to the constituents of the IN-939 specification, with the amount of zirconium being reduced in a like amount, or the amount of nickel being reduced in a like amount, or the amounts of both zirconium and nickel being reduced in a like total amount. The amount of zirconium in the new composition may be reduced from the 0.14% of the IN-939 specification to less than 0.04%, or to the range of 0.005–0.040 wt. %, with the percentage of nickel changing accordingly. Further, the new composition may include boron in the reduced range of 0.001–0.005 wt. %, with the balance of nickel being adjusted accordingly. The combination of zirconium, boron and scandium in the new superalloy may be in the range of 0.005–0.06 wt. %. Such an alloy does not contain any of the platinum group of elements. Other embodiments of such a novel scandium-containing superalloy may contain less than 3% by weight of the platinum group metals platinum, palladium, rhodium, iridium, osmium and ruthenium.

A sample of the prior art IN-939 superalloy was subjected to a Sigmajig test and achieved a threshold stress of 10 ksi. The baseline IN-939 sample contained the following composition expressed as weight percentages: chromium 22.5%; cobalt 19.0%; titanium 3.7%; tungsten 2.0%; aluminum 1.9%; niobium 1.0%; tantalum 1.4%; carbon 0.15%; zirconium 0.10%; boron 0.010%; and the balance nickel.

A sample of a new superalloy composition as described above was also subjected to a Sigmajig test and achieved a threshold stress of 15 ksi. This represents a 50% improvement in resistance to hot cracking over the baseline IN-939 alloy. The sample of the new superalloy contained the following composition expressed as weight percentages: chromium 22.3%; cobalt 18.7%; titanium 3.8%; aluminum 1.9%; tungsten 1.9%; niobium 1.0%; tantalum 1.3%; carbon 0.14%; zirconium less than 0.001%; boron 0.005%; sulfur 0.0006%; scandium 0.023%; and the balance nickel. Note that this sample contained essentially no zirconium. It is expected that the addition of 0.005–0.040% zirconium to such a composition (with the nickel balance reduced accordingly) would result in a further significant increase in the Sigmajig threshold stress, perhaps by as much as an additional 25–50%. This supposition is based upon testing that has been performed on a nickel-based alloy having a similar composition but lacking any scandium. In those tests, the Sigmajig threshold stress generally peaked at between 0.01–0.02% by weight zirconium, and it returned to near its zero-zirconium value when the zirconium content was increased above about 0.040 wt. % zirconium. At least some zirconium is desired in order to provide at least a minimum liquidity for the weld bead to flow properly.

Scandium has a higher solubility in the gamma phase and therefore partitions less to the final liquid during freezing of the weld bead, so low levels of scandium do not provide this desired liquidity. Thus, an improved superalloy as described herein may contain at least 0.005 wt. % zirconium, or it may contain less than 0.040 wt. % zirconium, or it may contain in the range of 0.005–0.040 wt. % zirconium.

The addition of scandium in the above described new superalloy sample also provided improved mechanical properties when compared to an IN-939 alloy containing low levels of zirconium. The rupture life at 1,600° F. and 37 ksi improved from an average of approximately 55 hours to over 160 hours. These improvements are postulated to be the result of one of several factors including: a reduction in the free sulfur content of the alloy via the formation of scandium sulfide or carbosulfide phases; the formation of scandium carbide phases; solid solution strengthening; a change in the grain boundary structure and/or diffusion rates; and/or a synergistic interaction with the boron in the alloy.

Some prior art superalloys, such as the material sold under the name GTD-222, have achieved improved weldability by reducing the composition of gamma-prime forming elements, such as titanium and aluminum. However, these reductions also result in a reduction in the high temperature strength of the alloy, since gamma prime is the phase responsible for elevated temperature strengthening. Alloying with scandium provide a means for improving the weldability of a superalloy without sacrificing elevated temperature properties. No change in the specification value for titanium or aluminum was made to arrive at the improved superalloy sample described above.

It is known to improve the weldability of a superalloy by over-aging the alloy in the range of temperatures in which the gamma prime phase first forms. Such over-aging results in a coarse gamma prime morphology. This coarse gamma prime morphology improves weldability by retarding the formation of additional gamma prime phase during the rapid solidification following fusion welding. While such overaging is effective, it is also expensive since it requires long furnace times. Scandium addition may facilitate the welding of a superalloy without the need for a long heat treatment, thereby providing a reduction in processing time and cost.

The new scandium-containing nickel-based superalloy described above may be coated with an aluminum-containing bond coat layer, such as an MCrAlY material as is known in the art. The scandium improves the oxidation resistance of the MCrAlY bond coat material by removing free sulfur in the alloy, thus improving the effective life of a thermal barrier coating applied to the alloy.

A commonly used cobalt-based superalloy, sold under the name ECY768, may have a portion of its zirconium replaced with scandium. A specification composition of ECY768 has the following range of constituents on a weight percentage basis: chromium 22.5–24,25%; nickel 9.0–11.0%; titanium 0.15–0.30%; tungsten 6.5–7.5%; tantalum 3.0–4.0%; carbon 0.55–0.65%; aluminum 0.10–0.25%; zirconium 0.050% maximum; boron 0.010% maximum; iron 1.5% maximum; silicon 0.40% maximum; manganese 0.10% maximum; sulfur 0.010% maximum; silver 0.0010% maximum; lead 0.0025 maximum; bismuth 0.0010% maximum; selenium 0.010% maximum; and the balance cobalt. A new cobalt-based superalloy composition may be made by reducing the zirconium in the above composition from 0.050% maximum to less than 0.040%, or to between 0.005–0.040 wt. %, and adding 0.005–0.5% scandium. No sample of such a cobalt-based superalloy with this composition has been tested as of the date of this application.

FIG. 1 illustrates a scandium-containing superalloy article as a vane 10 of a gas turbine engine. The vane 10 includes an airfoil section 12 connected to two shrouds 14. The airfoil 12 includes a leading edge 18 that may be subject to erosion damage during operation due to impact with particles of moisture and solid matter carried with the hot combustion gas passing over the airfoil 12. The vane 10 may be formed by using an investment casting process with a novel cast superalloy as described above and containing at least 0.005 wt. % scandium, or at least 0.100 wt. % scandium, or at least 0.300 wt. % scandium, or between 0.005–0.5 wt. % scandium, or between 0.005–0.1 wt. % scandium. The superalloy may be similar to any known composition of cobalt-based or nickel-based superalloy, but with the above-cited quantity of scandium being added to the known alloy composition as a replacement for an equal amount of zirconium, or as a replacement for an equal amount of the cobalt or nickel base material, or as a replacement for parts of both the zirconium and the base material of the known composition. The superalloy may further include at least 0.005 wt. % zirconium, or between 0.005–0.04 wt. % zirconium, or less than 0.04% by weight zirconium. It may further include boron in the range of 0.001–0.005 wt. %. The combination of zirconium, boron and scandium in the superalloy material may be in the range of 0.005–0.060 wt. %. Such a composition will provide a fusion weldable article having desired high temperature mechanical properties and desired corrosion and oxidation resistance.

The superalloy turbine vane 10 may have an intact region 20 where no damage has occurred, and it may have a repaired region 22. Because the new superalloy described herein has improved weldability when compared to similar prior art compositions, repaired region 22 may be formed by a fusion welding process. A region of an article may be dressed and cleaned as necessary to remove damaged material and contaminants, and a fusion weld used to add material to form a repaired region 22. The fusion welding process may be a tungsten inert gas (TIG) process with filler metal added as needed to achieve a desired contour. The filler metal may be Nimonic 263 or IN-625 when using an alloy similar to IN-939 but with added scandium. Process requirements would include low heat input during welding and high preheat.

Service-run superalloy components are often found to be non-weldable even though the original as-cast material had acceptable weldability. This may be due to the formation of a continuous or semi-continuous string of carbide phase at the grain boundaries of the material. These carbides may be zirconium-rich, and during fusion welding, they afford a ready supply of zirconium to the molten metal in the weldment. Zirconium forms a low melting point eutectic phase with nickel, increasing the freezing range of the weld metal and causing liquation cracking of the weldment. The reduction or replacement of zirconium with scandium as described above may reduce or eliminate the difficulty of weld repair of service-run parts. by affording acceptable mechanical properties at reduced zirconium levels in the material.

Figure 2:
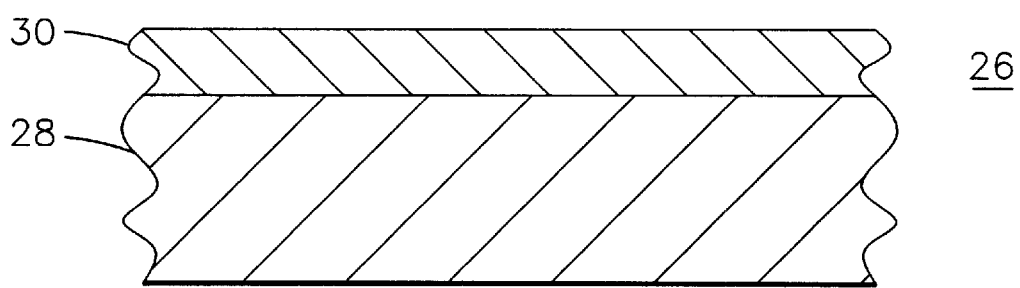
FIG. 2 is a partial cross-sectional view of a gas turbine component and illustrating a substrate of scandium-containing superalloy and an overlying MCrAlY bond coat.

FIG. 2 illustrates a partial cross-sectional view of a gas turbine component 26 including a cast superalloy substrate 28 and an overlying aluminum-containing layer 30 of MCrAlY material. The superalloy substrate 28 may be formed of an investment cast scandium-containing superalloy as described above. The alloy may have a composition of at least 45% by weight of one of the group of nickel and cobalt; 18–37% by weight chromium; at least 0.005% by weight scandium; and less than 0.04% by weight zirconium.

This fusion weldable alloy may further include 0.005–0.040% by weight zirconium, and at least 0.100% by weight scandium, or at least 0.300% by weight scandium, or 0.005–0.5% by weight scandium, or 0.005–1.0% by weight scandium. The scandium in the substrate material 28 improves the oxidation life of the MCrAlY coating 30 by reducing the free sulfur in the alloy.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A nickel-based superalloy consisting essentially of the composition by weight percent of: chromium 22.0–22.8%; cobalt 18.5–19.5%; titanium 3.6–3.8%; aluminum 1.8–2.0%; tungsten 1.8–2.2%; niobium 0.9–1.1%; tantalum 1.3–1.5%; carbon 0.13–0.17%; zirconium 0.005–0.040%; boron 0.004–0.014%; iron 0.5% maximum; sulfur 0.005% maximum; silver 0.0005% maximum; bismuth 0.00005% maximum; silicon 0.2% maximum; manganese 0.2% maximum; lead 0.005% maximum; nitrogen 0.005% maximum; scandium 0.005–10%; and the balance nickel.

2. The nickel-based superalloy of claim 1 having greater than 0.100% scandium.

3. The nickel-based superalloy of claim 1 having greater than 0.300% scandium.

4. The nickel-based superalloy of claim 1 having 0.005–0.5% scandium.

5. A turbine component made from the nickel-based superalloy of claim 1.

6. The turbine component of claim 5, further comprising an MCrAlY bond coat disposed over a surface of the nickel-based superalloy.

7. The turbine component of claim 5, further comprising a fusion weld repaired area formed in the nickel-based superalloy.

8. A fusion weldable alloy comprising:

at least 45% by weight of at least one of the group of nickel and cobalt;

18–37% by weight chromium;

less than 2% by weight palladium;

at least 0.005% by weight scandium; and less than 0.04% by weight zirconium.

9. The fusion weldable alloy of claim 8 comprising 0.005–0.040% by weight zirconium.

10. The fusion weldable alloy of claim 8 comprising at least 0.100% by weight scandium.

11. The fusion weldable alloy of claim 8 comprising at least 0.300% by weight scandium.

12. The fusion weldable alloy of claim 8 comprising 0.005–0.5% by weight scandium.

13. The fusion weldable alloy of claim 8 comprising 0.005–1.0% by weight scandium.

14. The fusion weldable alloy of claim 8, further comprising less than 3% by weight of the platinum group metals platinum, palladium, rhodium, iridium, osmium and ruthenium.

15. The fusion weldable alloy of claim 8, further comprising between 0.001–0.005% by weight boron.

16. The fusion weldable alloy of claim 15, wherein the combination of zirconium, boron and scandium is in the range of 0.005–0.06%.

17. A turbine component made from the fusion weldable alloy of claim 8.

18. The turbine component of claim 17, further comprising an MCrAlY bond coat disposed over a surface of the fusion weldable alloy.

19. The turbine component of claim 17, further comprising a fusion weld repaired area formed in the fusion weldable alloy.

20. A turbine component made from a fusion weldable alloy comprising:

at least 45% by weight of at least one of the group of nickel and cobalt;

18–37% by weight chromium;

at least 0.005% by weight scandium;

less than 0.04% by weight zirconium; and an aluminum containing bond coat disposed over a surface of the fustion weldable alloy.

* * * * *